(12) United States Patent
Cherian et al.

(10) Patent No.: US 9,241,298 B2
(45) Date of Patent: Jan. 19, 2016

(54) DEVICES AND METHODS FOR FACILITATING ACCESS PROBE SEQUENCES

(71) Applicant: Qualcomm Incorporated, San Diego, CA (US)

(72) Inventors: George Cherian, San Diego, CA (US); Jun Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 614 days.

(21) Appl. No.: 13/647,893

(22) Filed: Oct. 9, 2012

(65) Prior Publication Data
US 2013/0130738 A1    May 23, 2013

Related U.S. Application Data

(60) Provisional application No. 61/561,638, filed on Nov. 18, 2011.

(51) Int. Cl.
*H04W 52/24* (2009.01)
*H04W 48/16* (2009.01)
(Continued)

(52) U.S. Cl.
CPC .......... *H04W 48/16* (2013.01); *H04W 36/0083* (2013.01); *H04W 52/228* (2013.01); *H04W 52/285* (2013.01); *H04W 36/08* (2013.01); *H04W 36/32* (2013.01); *H04W 48/20* (2013.01); *H04W 52/10* (2013.01); *H04W 52/225* (2013.01); *H04W 52/50* (2013.01)

(58) Field of Classification Search
CPC ..... H04W 52/24; H04W 52/50; H04L 1/0003
USPC .......................................................... 455/522
See application file for complete search history.

(56) References Cited

U.S. PATENT DOCUMENTS

| 5,430,760 | A | * | 7/1995 | Dent | H04J 13/004 375/141 |
| 5,544,196 | A | * | 8/1996 | Tiedemann, Jr. | H04B 1/707 370/335 |

(Continued)

FOREIGN PATENT DOCUMENTS

| EP | 2469942 A1 | 6/2012 |
| EP | 2521397 A1 | 11/2012 |

(Continued)

OTHER PUBLICATIONS

International Search Report and Written Opinion—PCT/US2012/065728—ISA/EPO—Jan. 31, 2013.

*Primary Examiner* — Hai V Nguyen
(74) *Attorney, Agent, or Firm* — Darren M. Simon

(57) ABSTRACT

Access terminals are adapted to transmit a plurality of previously successful access probes to a network node, and determine an initial transmission power level for subsequent access attempts. The initial transmission power level can be determined based at least in part on one or more parameters associated with the plurality of previously successful access probes. An initial access probe of a subsequent access attempt can then be transmitted at the determined initial transmission power level. Network nodes that receive the one or more access probes from access terminals can send a message instructing the access terminals to employ a particular initial transmission power level for a subsequent access attempt. Other aspects, embodiments, and features are also included.

25 Claims, 8 Drawing Sheets

(51) Int. Cl.
*H04W 52/28* (2009.01)
*H04W 36/00* (2009.01)
*H04W 52/10* (2009.01)
*H04W 52/22* (2009.01)
*H04W 52/50* (2009.01)
*H04W 48/20* (2009.01)
*H04W 36/08* (2009.01)
*H04W 36/32* (2009.01)

(56) References Cited

U.S. PATENT DOCUMENTS

| | | | | |
|---|---|---|---|---|
| 5,940,743 | A * | 8/1999 | Sunay | H04W 52/283 370/331 |
| 6,101,179 | A * | 8/2000 | Soliman | H04W 52/10 370/342 |
| 6,118,997 | A | 9/2000 | Kim | H04W 28/08 370/335 |
| 6,292,519 | B1 * | 9/2001 | Popovic | H04L 1/20 375/130 |
| 6,498,785 | B1 * | 12/2002 | Derryberry | H04W 52/16 370/311 |
| 6,615,050 | B1 * | 9/2003 | Tiedemann, Jr. | H04B 1/707 455/522 |
| 6,674,739 | B1 * | 1/2004 | Lee | H04B 7/2628 370/320 |
| 6,845,245 | B2 * | 1/2005 | Hunzinger | H04W 24/04 455/436 |
| 6,871,078 | B2 * | 3/2005 | Nishioka | H04W 52/50 370/318 |
| 6,937,641 | B2 * | 8/2005 | Li | H04W 52/08 370/342 |
| 6,950,417 | B2 * | 9/2005 | Soliman | H04W 72/085 370/331 |
| 6,952,411 | B2 * | 10/2005 | Sinnarajah | H04L 1/188 370/335 |
| 6,985,728 | B2 * | 1/2006 | Tiedemann, Jr. | H04B 1/707 370/515 |
| 6,987,982 | B2 * | 1/2006 | Willenegger | H04W 52/223 370/329 |
| 7,024,217 | B2 * | 4/2006 | Hunzinger | H04W 24/04 370/229 |
| 7,190,688 | B1 | 3/2007 | Kamel et al. | |
| 7,228,134 | B2 * | 6/2007 | Gandhi | H04W 48/06 455/434 |
| 7,239,884 | B2 * | 7/2007 | Khawand | H04W 52/10 455/127.1 |
| 7,342,898 | B2 * | 3/2008 | Moon | H04W 52/228 370/318 |
| RE40,253 | E * | 4/2008 | Kim | H04J 3/16 370/335 |
| 7,433,331 | B2 * | 10/2008 | Welnick | H04W 36/16 370/328 |
| 7,630,719 | B2 * | 12/2009 | Bender | H04W 76/02 455/434 |
| 7,636,322 | B1 * | 12/2009 | Gandhi | H04W 72/085 370/252 |
| 8,194,562 | B1 * | 6/2012 | Gandhi | H04W 72/085 370/252 |
| 8,284,793 | B2 * | 10/2012 | Santhanam | H04W 74/0816 370/431 |
| 8,320,318 | B2 * | 11/2012 | Baker | H04W 52/50 370/329 |
| 8,391,412 | B1 * | 3/2013 | Oroskar | H04B 7/216 370/335 |
| 8,526,990 | B1 * | 9/2013 | Pulugurta | H04W 52/04 455/522 |
| RE44,530 | E * | 10/2013 | Kim | H04J 3/16 370/335 |
| 8,626,224 | B1 * | 1/2014 | Vargantwar | H04W 52/146 370/318 |
| 8,626,228 | B1 * | 1/2014 | Pulugurta | H04W 52/50 455/41.2 |
| 8,743,809 | B2 * | 6/2014 | Vashi | H04W 72/02 370/329 |
| 8,797,997 | B2 * | 8/2014 | Jang | H04W 52/146 340/7.36 |
| 9,025,572 | B2 * | 5/2015 | Wang | H04W 52/343 370/336 |
| 2002/0082032 | A1 * | 6/2002 | Hunzinger | H04W 24/04 455/510 |
| 2002/0085513 | A1 | 7/2002 | Moon | |
| 2002/0183086 | A1 * | 12/2002 | Hellmark | H04W 52/10 455/522 |
| 2003/0039231 | A1 * | 2/2003 | Sinnarajah | H04L 1/188 370/335 |
| 2003/0148765 | A1 | 8/2003 | Ma et al. | |
| 2004/0147274 | A1 * | 7/2004 | Khawand | H04W 52/10 455/522 |
| 2004/0233870 | A1 * | 11/2004 | Willenegger | H04W 52/223 370/329 |
| 2004/0259528 | A1 * | 12/2004 | Gandhi | H04W 48/06 455/411 |
| 2005/0096064 | A1 * | 5/2005 | Hunzinger | H04W 24/04 455/452.2 |
| 2005/0227721 | A1 | 10/2005 | Nakao | |
| 2005/0233700 | A1 | 10/2005 | Pecen et al. | |
| 2006/0014557 | A1 * | 1/2006 | Rajkotia | H04W 52/50 455/522 |
| 2006/0148490 | A1 | 7/2006 | Bates et al. | |
| 2007/0099645 | A1 * | 5/2007 | Kim | H04W 52/146 455/522 |
| 2007/0178929 | A1 | 8/2007 | Kim | |
| 2008/0220784 | A1 * | 9/2008 | Somasundaram | H04W 36/0083 455/437 |
| 2008/0225801 | A1 | 9/2008 | Turk | |
| 2008/0232304 | A1 * | 9/2008 | Mooney | H04W 74/0875 370/328 |
| 2009/0291688 | A1 | 11/2009 | Uehara et al. | |
| 2010/0081455 | A1 | 4/2010 | Teasdale et al. | |
| 2010/0226267 | A1 * | 9/2010 | Jang | H04W 52/146 370/252 |
| 2010/0290408 | A1 * | 11/2010 | Steudle | H04W 52/50 370/329 |
| 2010/0302934 | A1 * | 12/2010 | Baker | H04W 52/50 370/217 |
| 2011/0026484 | A1 | 2/2011 | Fox et al. | |
| 2011/0051697 | A1 * | 3/2011 | Wang | H04W 52/343 370/336 |
| 2011/0124330 | A1 | 5/2011 | Kojima | |
| 2011/0130141 | A1 | 6/2011 | Frost et al. | |
| 2011/0269447 | A1 | 11/2011 | Bienas et al. | |
| 2011/0319080 | A1 | 12/2011 | Bienas et al. | |
| 2013/0065590 | A1 * | 3/2013 | Jang | H04W 52/146 455/436 |
| 2013/0089039 | A1 * | 4/2013 | Vashi | H04W 72/02 370/329 |
| 2013/0089079 | A1 * | 4/2013 | Amirijoo | H04L 1/20 370/336 |
| 2013/0130689 | A1 | 5/2013 | Cherian et al. | |
| 2013/0130738 | A1 * | 5/2013 | Cherian | H04W 52/228 455/522 |
| 2013/0188503 | A1 | 7/2013 | Anepu et al. | |
| 2013/0188562 | A1 * | 7/2013 | Espina Perez | H04L 1/188 370/328 |
| 2013/0308579 | A1 * | 11/2013 | Pulugurta | H04W 52/04 370/329 |

FOREIGN PATENT DOCUMENTS

| | | |
|---|---|---|
| JP | 2005064949 A | 3/2005 |
| JP | 2005269118 A | 9/2005 |
| JP | 2006352883 A | 12/2006 |
| JP | 2007097055 A | 4/2007 |
| JP | 2008048233 A | 2/2008 |
| JP | 2008148136 A | 6/2008 |
| JP | 2008211599 A | 9/2008 |
| JP | 2009027459 A | 2/2009 |
| JP | 2010087952 A | 4/2010 |
| KR | 20100016494 A | 2/2010 |

(56) References Cited

FOREIGN PATENT DOCUMENTS

| WO | 0203719 | A2 | 1/2002 |
| WO | 02099996 | A1 | 12/2002 |
| WO | 2007088381 | A1 | 8/2007 |
| WO | 2008115786 | A1 | 9/2008 |
| WO | 2010138601 | A2 | 12/2010 |

* cited by examiner

DEVICES AND METHODS FOR FACILITATING ACCESS PROBE SEQUENCES

CROSS REFERENCE TO RELATED APPLICATION & PRIORITY CLAIM

The present application for patent claims priority to Provisional Application No. 61/561,638 entitled "METHODS AND DEVICES FOR FACILITATING POWER CONSERVATION AND NETWORK OPTIMIZATIONS WHEN ACCESS TERMINALS EXHIBIT LITTLE OR NO MOBILITY" filed Nov. 18, 2011, and assigned to the assignee hereof and hereby expressly incorporated by reference herein.

TECHNICAL FIELD

Embodiments of the present invention relate generally to wireless communications, and more specifically, to methods and devices for facilitating optimized access probe sequences.

BACKGROUND

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems.

Multiple types of devices are adapted to utilize such wireless communications systems. Such devices may be generally referred to as access terminals. Often access terminals are adapted for mobility, such that the access terminal can move throughout a geographic region while maintaining access to the wireless communications system. However, some access terminals may experience little to no change in location. Some examples of access terminals that experience little to no change in location include access terminals adapted for machine-to-machine (M2M) communications (also sometimes referred to as machine-type communication or MTC). An M2M adapted access terminal may include an access terminal that is adapted to operate at least substantially without user interaction.

BRIEF SUMMARY OF SOME EMBODIMENTS

Various types of access terminals often operate on a limited power source, such as a battery. Accordingly, features may be desirable to improve the life of these limited power sources. Various examples and implementations of the present disclosure facilitate power conservation by optimizing access probe sequences. One or more aspects of the present disclosure include access terminals adapted to facilitate access probe sequences according to one or more features of the present disclosure. In at least one example, such access terminals may include a communications interface and a storage medium, each coupled to a processing circuit. The processing circuit can be adapted to transmit a plurality of previously successful access probes via the communications interface. Based at least in part on one or more parameters associated with the plurality of previously successful access probes, the processing circuit may determine an initial transmission power level. The determined initial power level may be employed by the processing circuit as a power level for transmitting an initial access probe of a subsequent access attempt.

Additional aspects of the present disclosure include methods operational on an access terminal and/or access terminals including means for performing such methods. One or more examples of such methods may include conducting a plurality of preceding access attempts. Each preceding access attempt may include transmitting access probes at successively increasing power levels until an access probe is successful. An initial transmission power level may be determined based at least in part on one or more parameters associated with at least some of the plurality of previously successful access probes. A subsequent access attempt may be conducted with an initial access probe transmitted at the determined initial transmission power level.

Further aspects of the present disclosure include processor-readable mediums including programming operational on an access terminal. According to one or more examples, such programming may cause a processor to determine an initial transmission power level based at least in part on one or more parameters associated with a plurality of previously successful access probes. The programming may further cause the processor to transmit an initial access probe of a subsequent access attempt at the determined initial transmission power level.

One or more further aspects of the present disclosure include network nodes. In at least one example, a network node may include a communications interface and a storage medium, each coupled with a processing circuit. The processing circuit may be adapted to receive one or more access probes from an access terminal. The processing circuit may further send a message via the communications interface to the access terminal. The message can be adapted to instruct the access terminal to employ a particular initial transmission power level for a subsequent access attempt.

Yet additional aspects of the present disclosure include methods operational on a network node and/or network nodes including means for performing such methods. One or more examples of such methods may include receiving one or more access probes from an access terminal. A message may be transmitted for the access terminal, which message may instruct the access terminal to employ a particular initial transmission power level for a subsequent access attempt.

Further aspects of the present disclosure include processor-readable mediums including programming operational on a network node. According to one or more examples, such programming may cause a processor to receive one or more access probes from an access terminal, and send a message instructing the access terminal to employ a particular initial transmission power level for a subsequent access attempt.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

In the following description, certain terminology is used to describe certain features of one or more examples. The term "access terminal" as used herein is meant to be interpreted broadly. For example, an "access terminal" refers generally to one or more devices that communicate with one or more other devices through wireless signals. Such access terminals may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. Access terminals may include mobile terminals and/or at least substantially stationary terminals. Examples of access terminals include mobile phones, pagers, wireless modems, personal digital assistants, personal information managers (PIMs), personal media players, palmtop computers, laptop computers, tablet computers, televisions, appliances, e-readers, digital video recorders (DVRs), machine-to-machine (M2M) devices, and/or other communication/computing devices which communicate, at least partially, through a wireless or cellular network.

The various concepts presented throughout this disclosure may be implemented across a broad variety of telecommunication systems, network architectures, and communication standards. Certain aspects of the disclosure are described below for CDMA and 3rd Generation Partnership Project 2 (3GPP2) 1× protocols and systems, and related terminology may be found in much of the following description. However, those of ordinary skill in the art will recognize that one or more aspects of the present disclosure may be employed and included in one or more other wireless communication protocols and systems.

Figure 1:
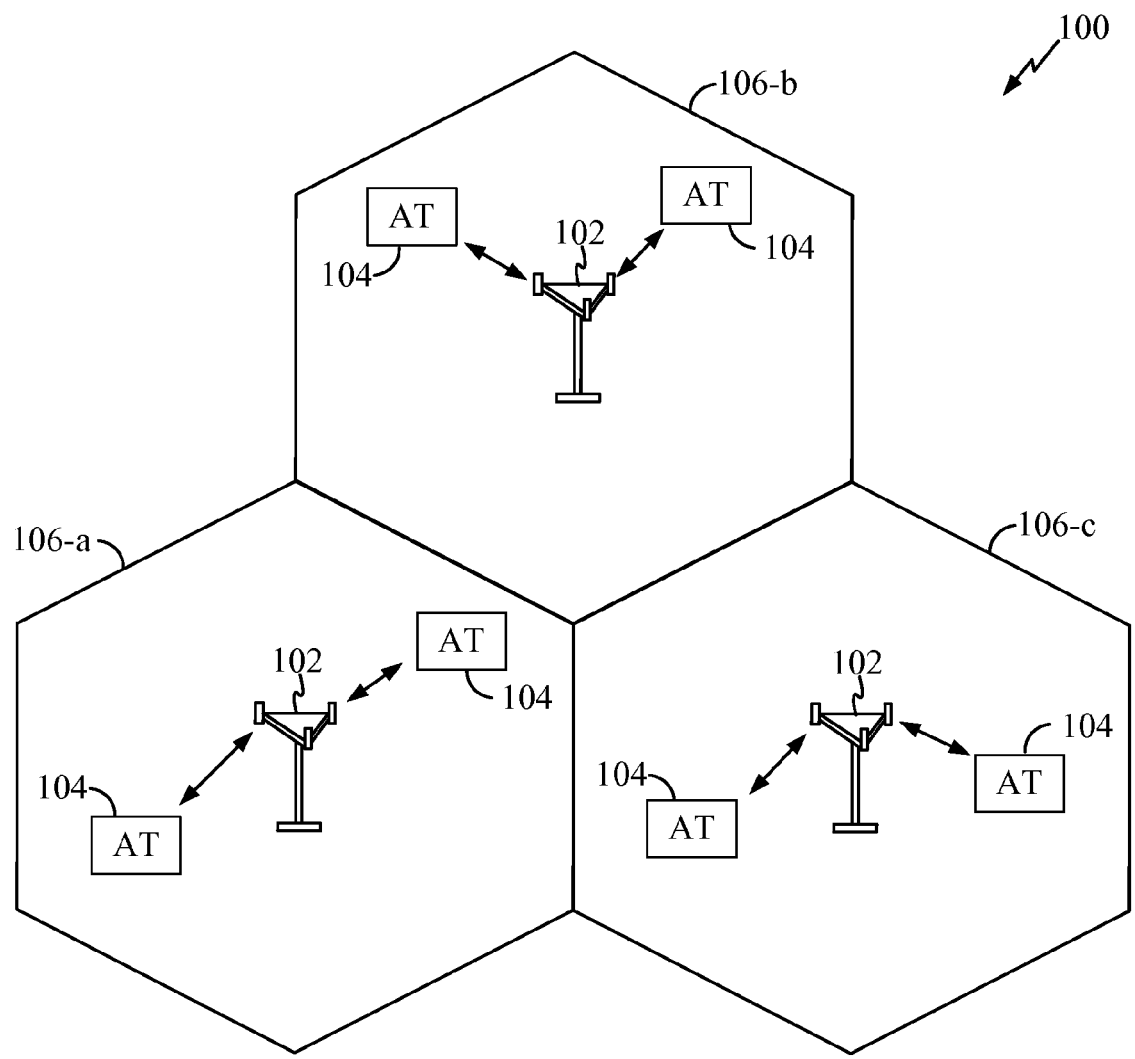
FIG. 1 is a block diagram of a network environment in which one or more aspects of the present disclosure may find application.

FIG. 1 is a block diagram of a network environment in which one or more aspects of the present disclosure may find application. The wireless communications system 100 includes base stations 102 adapted to communicate wirelessly with one or more access terminals 104. The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 can wirelessly communicate with the access terminals 104 via a base station antenna. The base stations 102 are configured to communicate with the access terminals 104 under the control of a base station controller (see FIG. 2) via multiple carriers. Each of the base station 102 sites can provide communication coverage for a respective geographic area. The coverage area 106 for each base station 102 here is identified as cells 106-$a$, 106-$b$, or 106-$c$. The coverage area 106 for a base station 102 may be divided into sectors (not shown, but making up only a portion of the coverage area). The system 100 may include base stations 102 of different types (e.g., macro, micro, and/or pico base stations).

Figure 2:
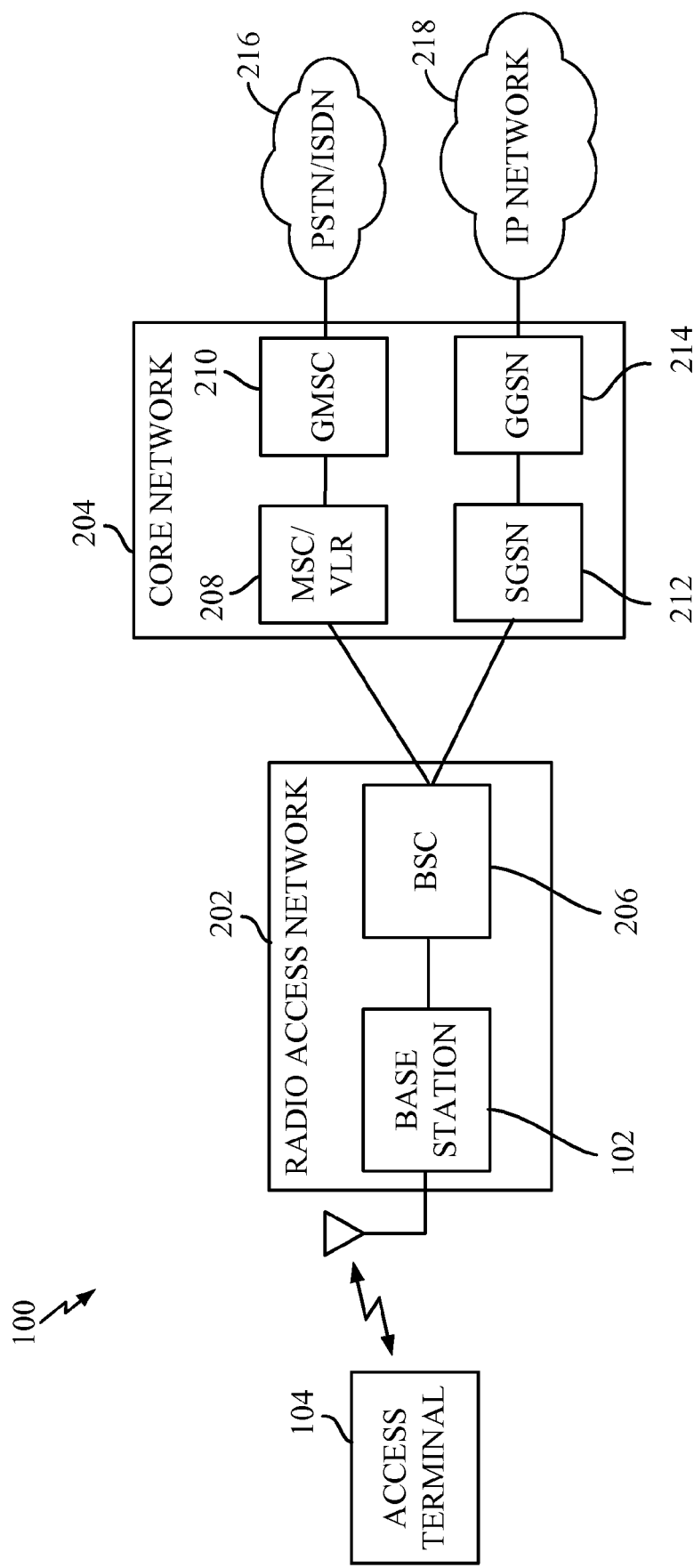
FIG. 2 is a block diagram illustrating select components of the wireless communication system of FIG. 1 according to at least one example.

The access terminals 104 may be dispersed throughout the coverage areas 106. Each access terminal 104 may communicate with one or more base station 102. FIG. 2 is a block diagram illustrating select components of the wireless communication system 100 according to at least one example. As illustrated, the base stations 102 are included as at least a part of a radio access network (RAN) 202. The radio access network (RAN) 202 is generally adapted to manage traffic and signaling between one or more access terminals 104 and one or more other network entities, such as network entities included in a core network 204. The radio access network 202 may also be referred to by those skill in the art as a base station subsystem (BSS), an access network, a UMTS Terrestrial Radio Access Network (UTRAN), etc.

In addition to one or more base stations 102, the radio access network 202 can include a base station controller (BSC) 206, which may also be referred to by those of skill in the art as a radio network controller (RNC). The base station controller 206 is generally responsible for the establishment, release, and maintenance of wireless connections within one or more coverage areas associated with the one or more base stations 102 which are connected to the base station controller 206. The base station controller 206 can be communicatively coupled to one or more nodes or entities of the core network 204.

The core network 204 is a portion of the wireless communications system 100 that provides various services to access terminals 104 that are connected via the radio access network 202. The core network 204 may include a circuit-switched (CS) domain and a packet-switched (PS) domain. Some examples of circuit-switched entities include a mobile switching center (MSC) and visitor location register (VLR), identified as MSC/VLR 208, as well as a Gateway MSC (GMSC) 210. Some examples of packet-switched elements include a Serving GPRS Support Node (SGSN) 212 and a Gateway GPRS Support Node (GGSN) 214. Other network entities may be included, such as a EIR, HLR, VLR and AuC, some or all of which may be shared by both the circuit-switched and packet-switched domains. An access terminal 104 can obtain access to a public switched telephone network (PSTN) 216 via the circuit-switched domain, and to an IP network 218 via the packet-switched domain.

As an access terminal 104 operates within the wireless communications system 100, the access terminal may transmit one or more access probes as part of a call setup procedure. An access probe refers to a transmission unit sent on an access channel (ACH) from an access terminal 104 to a base station 102 for call setup. In a conventional wireless communications system, access probes may be transmitted by an access terminal 104 at sequentially increasing power levels. For instance, referring to FIGS. 1 and 3, an access terminal 104 will transmit an initial access probe 302 at a first or initial transmission power level. If the initial access probe does not succeed (or fails) (i.e., the access terminal 104 does not receive a response message from the base station 102 as illustrated by the no response block 304), the access terminal 104 increases the transmission power level according to a predetermined power increment and then transmits a subsequent access probe 306. Each time a preceding access probe does not succeed, the access terminal 104 increases the transmission power level according to the predetermined power increment and transmits a subsequent access probe, until it is successful (e.g., probe 308 is successful because a response message was received) or the power level maximum is reached.

Figure 3:
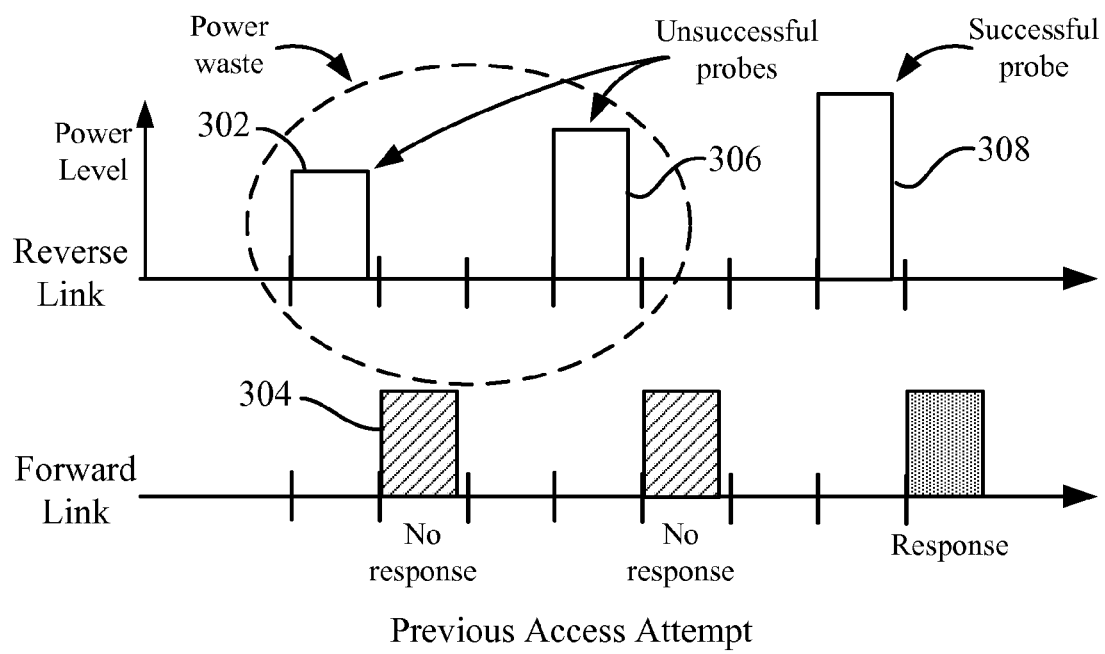
FIG. 3 is a block diagram illustrating access probes associated with a previous access attempt and an access probe associated with a subsequent access attempt, according to at least one example.
Figure 3:
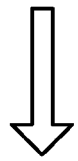
Figure 3:
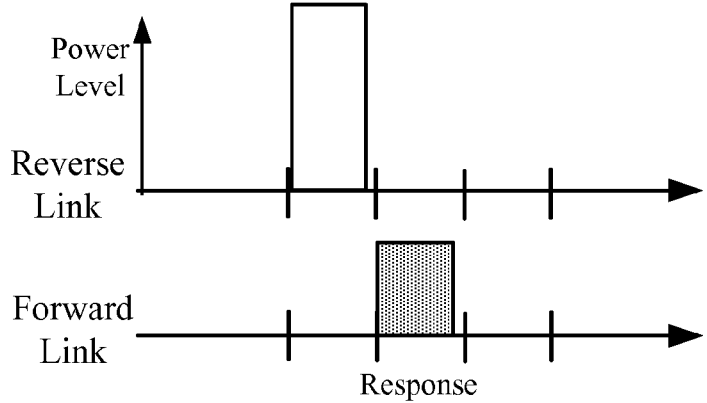

For any subsequent access attempts by the access terminal 104, this access probe sequence is typically repeated by transmitting the initial access probe at the same initial transmission power level and increasing the transmission power level by the predetermined power increment. Notably, for each unsuccessful access probe that the access terminal 104 transmits, power is wasted, as shown in FIG. 3. That is, the power consumed by the access terminal 104 for transmitting unsuccessful access probes is wasted, since the unsuccessful access probes do not further the call setup process between the access terminal 104 and the wireless communications network 100.

In some instances, one or more of the access terminals 104 may be stationary or substantially stationary such that the power level for the successful access probe of various access attempts may be at least substantially similar One example of such stationary or substantially stationary access terminals 104 includes machine-to-machine (M2M) enabled access terminals 104. M2M enabled access terminals 104 are adapted to wirelessly communicate with one or more devices over the wireless communication system 100, at least substantially without user interaction. M2M access terminals 104 may comprise a communications device adapted to capture an event (e.g., a sensor that captures temperature, a meter to capture inventory level, etc.), which is relayed through the wireless communication system 100 to an application (e.g., software program), where the event data can be translated into meaningful information (e.g., temperature needs to be lowered/raised, items need to be restocked, etc.). By way of example and not limitation, an M2M access terminal 104 may include a thermostat, a water meter, a sprinkler system, a smart-meter, an appliance, etc.

As noted, an access terminal 104 that is stationary or substantially stationary may generally retain similar signal parameters between a particular base station 102. As a result, the transmission power level for each successful access probe may be at least substantially similar for a plurality of access attempts. According to at least one feature, access terminals 104 of the present disclosure may be adapted to employ information associated with previously successful access probes to determine an initial transmission power level for an initial access probe of subsequent access attempts for reducing or even eliminating the transmission of unsuccessful access probes, as illustrated at the bottom of the block diagram of FIG. 3.

Figure 4:
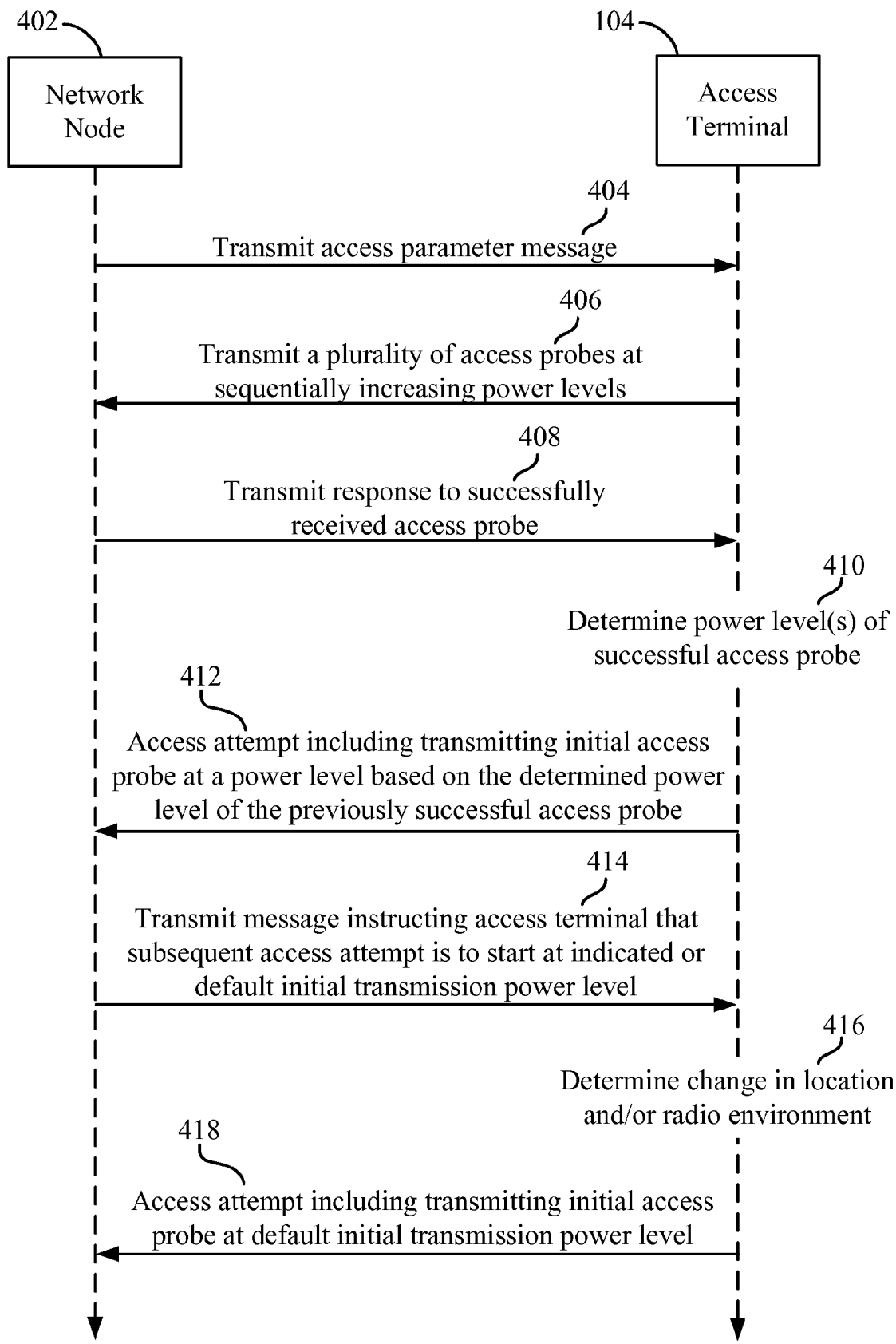
FIG. 4 is a flow diagram illustrating an example for facilitating access attempts while reducing power consumption at the access terminal according to some embodiments of the present invention.

FIG. 4 is a flow diagram illustrating an example for facilitating access attempts while reducing power consumption at the access terminal. As shown, the access terminal 104 can communicate with a network node 402. The network node 402 may represent one or more network elements, such as a base station 102, a base station controller 206, and/or a MSC/VLR 208, which are illustrated in FIGS. 1 and 2. Initially, the network node 402 may transmit an access parameter message 404 indicating an initial power level for an access probe sequence, as well as the power increment for each subsequent access probe.

When the access terminal 104 initiates an access attempt, the access terminal 104 may transmit a plurality of access probes 406 at sequentially increasing transmission power levels. In response to successfully receiving one of the plurality of access probes, the network node 402 transmits a response 408 to the access terminal 104. On receipt of the response from the network node 402, the access terminal 104 can determine a transmission power level 410 associated with the access probe that was successfully received by the network node 402.

Using the determined transmission power level 410 associated with one or more previously successful access probes, the access terminal 104 may initiate another access attempt, which typically includes sending another one or more access probes, e.g., at sequentially increasing power levels. However, instead of starting at the default initial transmission power level, the access terminal 104 may transmit the first access probe at a transmission power level 412 based on the transmission power level(s) associated with the previously successful access attempt(s).

In at least some instances, the network node 402 may be adapted to send a message 414 to the access terminal 104 instructing the access terminal 104 that a subsequent access attempt should start with an initial access probe transmitted at an indicated and/or default first or initial transmission power level. In this instance, the access terminal 104 will perform the conventional access probe sequence, with the first access probe being sent at the first or initial transmission power level, and each subsequent access probe being sent at a sequentially higher transmission power level until an access probe is successful. In at least some instances, the network node 402 may send such a message in response to a change of one or more parameters at the network node 402 that may have an effect on the transmission power of access probes sent by the access terminal 104.

In at least some instances, the access terminal 104 may be adapted to determine that a location of the access terminal 104 has changed significantly, and/or a radio environment (e.g., relative signal strength of one or more neighboring cells) has changed significantly 416. In such instances, the access terminal 104 may perform the conventional access probe sequence 418, with the first access probe being sent at the first or initial transmission power level (e.g., default transmission power level indicated by the access parameter message 404), and each subsequent access probe being sent at a sequentially higher transmission power level until an access probe is successful.

Figure 5:
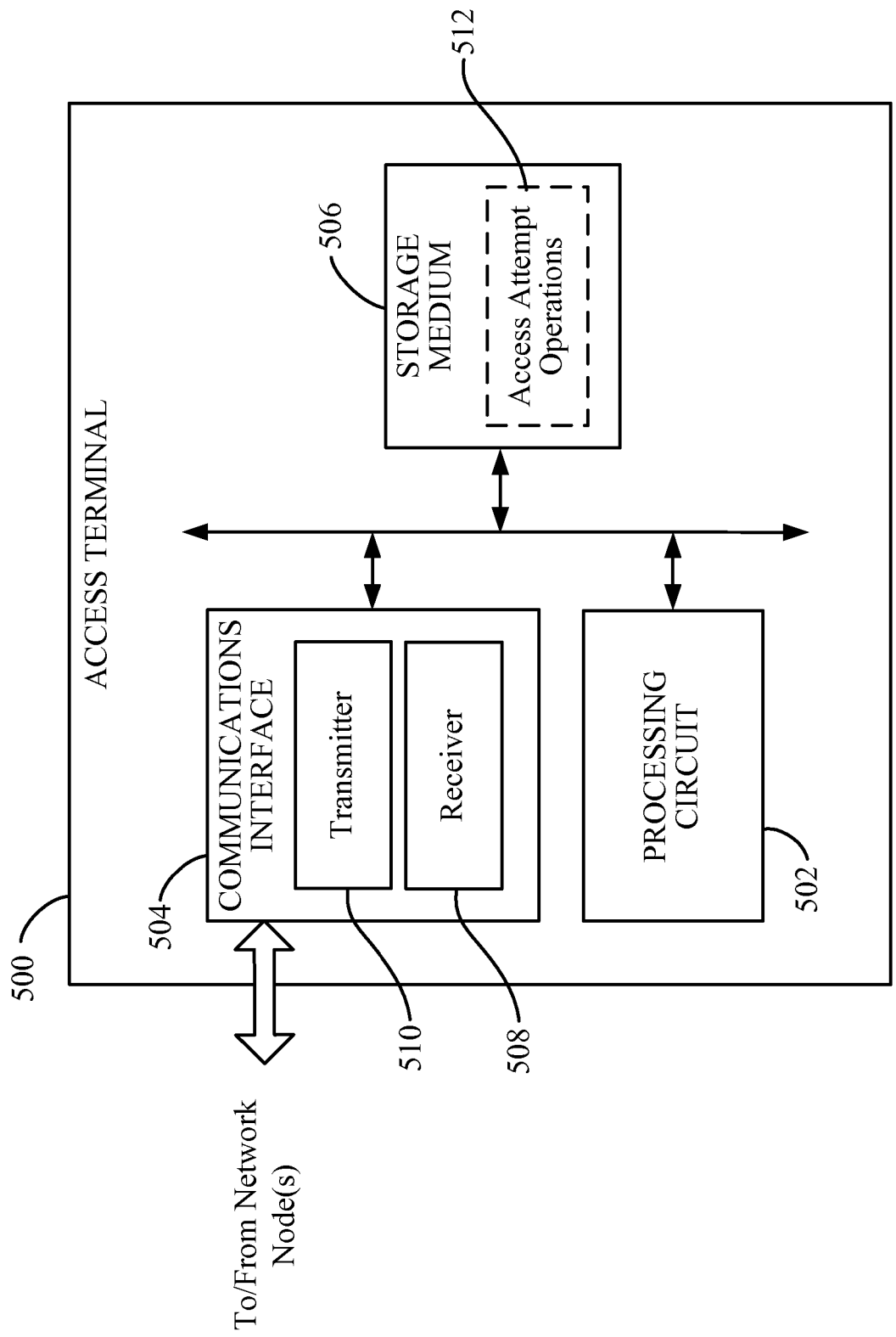
FIG. 5 is a block diagram illustrating select components of an access terminal according to at least one example.

FIG. 5 is a block diagram illustrating select components of an access terminal 500 according to at least one example. The access terminal 500 may include a processing circuit 502 coupled to or placed in electrical communication with a communications interface 504 and a storage medium 506. The interface can be a receiver, transmitter, or transceiver.

The processing circuit 502 is arranged to obtain, process and/or send data, control data access and storage, issue commands, and control other desired operations. The processing circuit 502 may include circuitry configured to implement desired programming provided by appropriate media in at least one example. For example, the processing circuit 502 may be implemented as one or more processors, one or more controllers, and/or other structure configured to execute executable programming Examples of the processing circuit 502 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 502 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 502 are for illustration and other suitable configurations within the scope of the present disclosure are also contemplated.

The processing circuit 502 is adapted for processing, including the execution of programming, which may be stored on the storage medium 506. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The communications interface 504 is configured to facilitate wireless communications of the access terminal 500. For example, the communications interface 504 may include circuitry and/or programming adapted to facilitate the communication of information bi-directionally with respect to one or more wireless network devices (e.g., network nodes). The communications interface 504 may be coupled to one or more antennas (not shown), and includes wireless transceiver circuitry, including at least one receiver circuit 508 (e.g., one or more receiver chains) and/or at least one transmitter circuit 510 (e.g., one or more transmitter chains).

The storage medium 506 may represent one or more devices for storing programming and/or data, such as processor executable code or instructions (e.g., software, firmware), electronic data, databases, or other digital information. The storage medium 506 may also be used for storing data that is manipulated by the processing circuit 502 when executing programming. The storage medium 506 may be any available media that can be accessed by a general purpose or special purpose processor. By way of example and not limitation, the storage medium 506 may include a non-transitory computer-readable medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other non-transitory computer-readable mediums for storing information, as well as any combination thereof.

The storage medium 506 may be coupled to the processing circuit 502 such that the processing circuit 502 can read information from, and write information to, the storage medium 506. That is, the storage medium 506 can be coupled to the processing circuit 502 so that the storage medium 506 is at least accessible by the processing circuit 502, including examples where the storage medium 506 is integral to the processing circuit 502 and/or examples where the storage medium 506 is separate from the processing circuit 502 (e.g., resident in the access terminal 500, external to the access terminal 500, distributed across multiple entities).

Programming stored by the storage medium 506, when executed by the processing circuit 502, causes the processing circuit 502 to perform one or more of the various functions and/or process steps described herein. For example, the storage medium 506 may include access attempt operations 512 adapted to cause the processing circuit 502 to perform one or more access attempts according to one or more of the features described herein. Thus, according to one or more aspects of the present disclosure, the processing circuit 502 is adapted to perform (in conjunction with the storage medium 506) any or all of the processes, functions, steps and/or routines for any or all of the access terminals (e.g., access terminal 102) described herein. As used herein, the term "adapted" in relation to the processing circuit 502 may refer to the processing circuit 502 being one or more of configured, employed, implemented, and/or programmed to perform a particular process, function, step and/or routine according to various features described herein.

Figure 6:
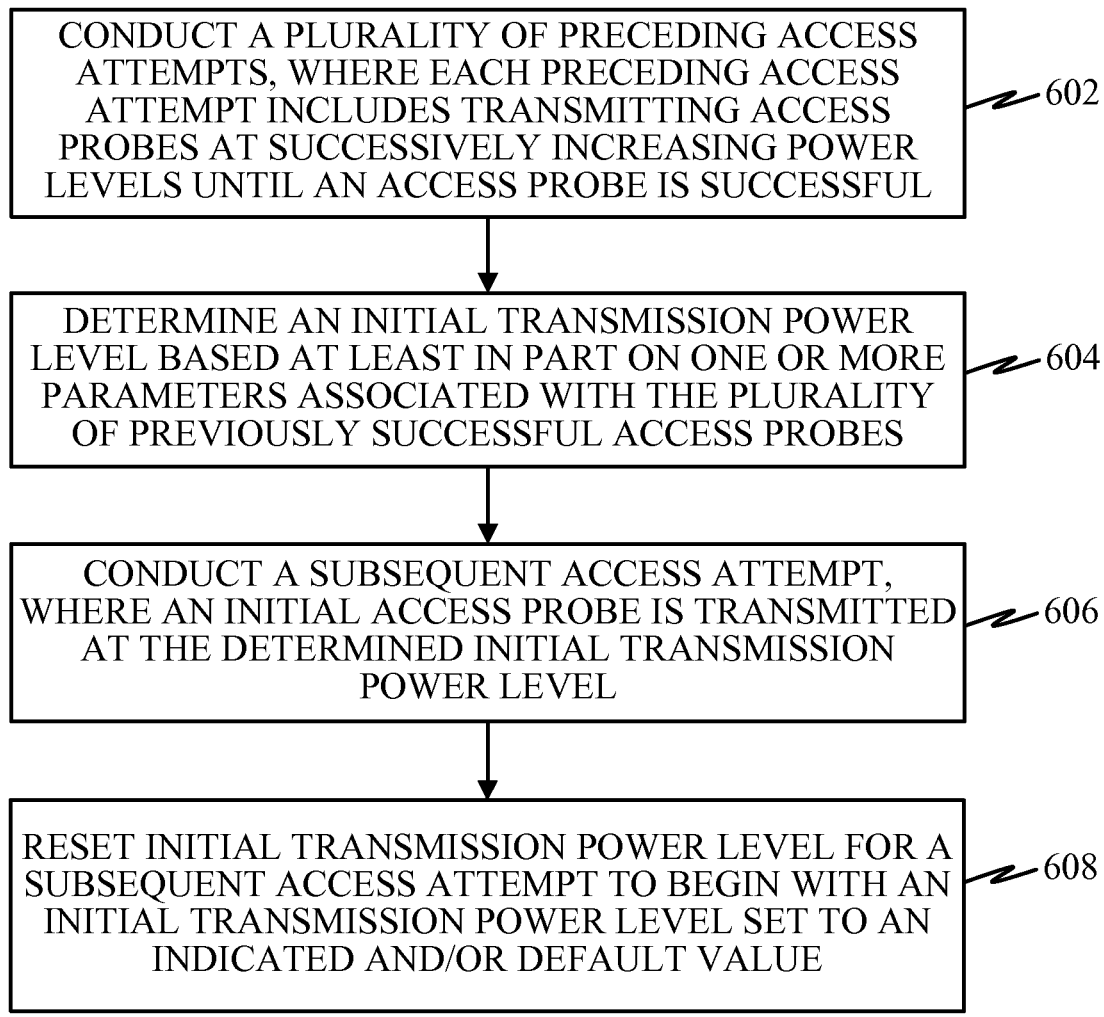
FIG. 6 is a flow diagram illustrating a method operational on an access terminal according to at least one example.

FIG. 6 is a flow diagram illustrating at least one example of a method operational on an access terminal, such as access terminal 500. Referring to FIGS. 5 and 6, an access terminal 500 can conduct a plurality of preceding access attempts at step 602. Each of the preceding access attempts may include transmitting access probes at successively increasing power levels until an access probe is successful. For example, the processing circuit 502 executing the access attempt operations 512 may conduct a plurality of preceding access attempts. For each preceding access attempt, the processing circuit 502 executing the access attempt operations 512 may transmit access probes via the communications interface 504 at successively increasing power levels until an access probe is successful. For at least the first access attempt, the initial transmission power level may be a default initial power level that is either previously provisioned in the access terminal 500 (e.g., previously stored in the storage medium 506), or an initial power level indicated by one or more messages (e.g., an access parameter message) received from the network via the communications interface 504.

At step 604, the access terminal 500 may determine an initial transmission power level for a subsequent access attempt based at least in part on one or more parameters associated with the plurality of previously successful access probes. For example, the processing circuit 502 executing the access attempt operations 512 may determine an initial power level for a subsequent access attempt based at least in part on the one or more parameters associated with at least some of the previously successful access probes. According to one or more examples, the one or more parameters may include the transmission power level associated with the previously successful access probes, the open-loop power level associated with the previously successful access probes, and/or the open-loop power level for the current access attempt.

In at least one example, the processing circuit 502 executing the access attempt operations 512 may determine the initial power level for the subsequent access attempt based at least in part on an average power level of at least some of the previously successful access probes. For instance, as the processing circuit 502 can conduct a plurality of access attempts, resulting in a plurality of successful access probes (e.g., access probes resulting in a response message from the network). The processing circuit 502 executing the access attempt operations 512 may store a value associated with the transmission power level for some number 'N' of the previously successful access probes. The processing circuit 502 executing the access attempt operations 512 can then subsequently calculate an average transmission power level for the 'N' number of successful access probes. This average transmission power level may represent the initial transmission power level to be employed by the processing circuit 502 for transmitting an initial access probe for a subsequent access attempt.

By averaging the transmission power levels associated with 'N' previously successful access probes, the processing circuit 502 can minimize instances where an access probe in a previous access attempt would have been successful, but encounters a problem so that the access probe failed. For instance, if an access probe sent at a transmission power level that would have been successful encounters a collision causing the access probe to fail, the processing circuit 502 may accordingly increase the transmission power level by the defined increment and send another access probe. By averaging the transmission power levels associated with some number 'N' of previously successful access probes, the processing circuit 502 can reduce the effect of this artificially high transmission power level.

In at least one example, the processing circuit 502 executing the access attempt operations 512 may employ an open-loop power level in determining the initial transmission power level for a subsequent access attempt. The open-loop power level refers to a detected power level corresponding, for example, to a received signal strength indicator (RSSI) associated with one or more specialized signals transmitted from the network (e.g., from a base station 102 of FIGS. 1 and 2) and received by the processing circuit 502 via the communications interface 504. For example, in CDMA systems a pilot signal can be used to estimate the channel conditions and then determine a power estimate for transmitting back to the network.

In one or more examples, the processing circuit 502 executing the access attempt operations 512 may determine the initial transmission power level for the subsequent access attempt based at least in part on a difference of an average open-loop power level associated with the plurality of previously successful access probes and an open-loop power level associated with the subsequent access attempt. In other words, the processing circuit 502 executing the access attempt operations 512 may determine an average open-loop power level ($R_{OLsucc}$) associated with some number 'N' of previously successful access probes. The processing circuit 502 executing the access attempt operations 512 may further determine the current open-loop power level ($R_{OLnew}$) that will be associated with a subsequent access attempt. The processing circuit 502 executing the access attempt operations 512 may then calculate the difference between the average open-loop power level and the current open-loop power level ($R_{OLsucc}$-$R_{OLnew}$), and may use this calculation in determining the initial power level for the subsequent access attempt. For example, a power level for a previously successful access probe (or an average power level for a plurality of previously successful access probes) may be adjusted in view of the result of this open-loop power level calculation to obtain the initial transmission power level for the subsequent access attempt.

This open-loop correction can, in at least one example, account for changes in the signal conditions between the access terminal 500 and the network node (e.g., the base station). For instance, if the open-loop power level has increased compared to a previous open-loop power level or average open-loop power level (e.g., as a result of the access terminal 500 being nearer to the network node), then the processing circuit 502 executing the access attempt operations 512 can determine that the initial power level for a subsequent access attempt can be lower than the previously successful power level (or the average of a plurality of previously successful power levels) Similarly, if the open-loop power level has decreased compared to a previous open-loop power level or average open-loop power level (e.g., as a result of the access terminal 500 being farther from the network node), then the processing circuit 502 executing the access attempt operations 512 can determine that the initial power level for a subsequent access attempt can be higher than the previously successful power level (or the average of a plurality of previously successful power levels.

In at least some examples, the processing circuit 502 executing the access attempt operations 512 may determine the initial transmission power level for the subsequent access attempt based at least in part on a combination of the average transmission power levels of a plurality of previously successful access attempts and an open-loop power level correction. For instance, the processing circuit 502 executing the access attempt operations 512 may determine an average power level ($P_{AP}$) of at least some of the plurality of previously successful access probes, an average open-loop power level ($R_{OLsucc}$) associated with the plurality of previously successful access probes, and an open-loop power level ($R_{OLnew}$) associated with the subsequent access attempt. The processing circuit 502 executing the access attempt operations 512 may then determine the initial transmission power level (P) from the equation $P=P_{AP}+(R_{OLsucc}-R_{OLnew})$.

At step 606, the access terminal 500 can conduct a subsequent access attempt, where an initial access probe is transmitted at the determined initial transmission power level. For example, the processing circuit 502 executing the access attempt operations 512 may conduct another (or subsequent) access attempt by transmitting via the communications interface 504 one or more subsequent access probes at sequentially increasing power levels. However, instead of transmitting the initial access probe of the subsequent access attempt at the default initial transmission power level, the processing circuit 502 executing the access attempt operations 512 may transmit the initial access probe via the communications interface 504 at a power level based on the determined initial transmission power level. Because the determined initial transmission power level is based at least partially on one or more previously successful access probes as described above with reference to step 604, the determined initial transmission power level is more likely to be a successful transmission power. That is, the determined initial transmission power level employed for transmitting the initial access probe will more likely result in the initial access probe being successful. When the initial access probe for each access attempt is successful, the access terminal 500 can conserve power, since there are either no failed access probes or substantially fewer failed access probes.

The access terminal 500 may receive access parameters messages from the network, which may define a value for an initial transmission power level and/or a value for the incremental increase in the transmission power level. In general, the access terminal 500 can be adapted to ignore these access parameter messages and to instead employ the determined initial transmission power level. In some instances, the access terminal 500 may, at step 608, reset the initial transmission power level to a default value or to a value indicated by the network for use in a subsequent access attempt.

In some examples, the access terminal 500 may receive a message from the network instructing the access terminal 500 to begin a subsequent access attempt with an initial transmission power level set to an indicated and/or default value. For instance, the processing circuit 502 executing the access attempt operations 512 may receive via the communications interface 504 a message from the network. The received message can be adapted to instruct the access terminal 500 to stop using the determined initial transmission power level and to use an indicated and/or default value. In some examples, the received message may comprise an access parameter message including the instruction for the access terminal 500. In other examples, the received message may comprise a message separate from an access parameter message.

In other examples, the access terminal 500 may determine that the access terminal 500 has significantly changed location and/or that there has been a significant change in the radio environment in which the access terminal 500 is operating. For example, the processing circuit 502 executing the access attempt operations 512 may determine a significant change in a location of the access terminal 500 and/or a significant change in the radio environment. By way of example and not limitation, the processing circuit 502 may determine a significant change in location based on information obtained from monitoring cell reselections, changes in relative pilot signal strength for one or more neighboring cells and/or a GPS location obtained from a GPS module (not shown) included in the access terminal 500. By way of further example and not limitation, the processing circuit 502 may determine a significant change in the radio environment based on monitoring changes in relative signal parameters (e.g., signal strength, signal quality, etc.) for one or more neighboring cells.

At least some of the features described herein for the access terminal 500 may be employed when the access terminal 500 is at least substantially stationary. In at least some instances the access terminal 500 may determine whether it is mobile or at least substantially stationary. For example, the processing circuit 502 may determine whether the access terminal 500 is mobile or at least substantially stationary. The processing circuit 502 may make such a determination from pre-configured information stored in the storage medium 506, by monitoring movement of the access terminal 500 via a GPS module, and/or by monitoring changes in relative pilot signal strength of for one or more neighboring cells (e.g., where a substantial change in relative pilot signal may indicate that the access terminal 500 has moved).

Figure 7:
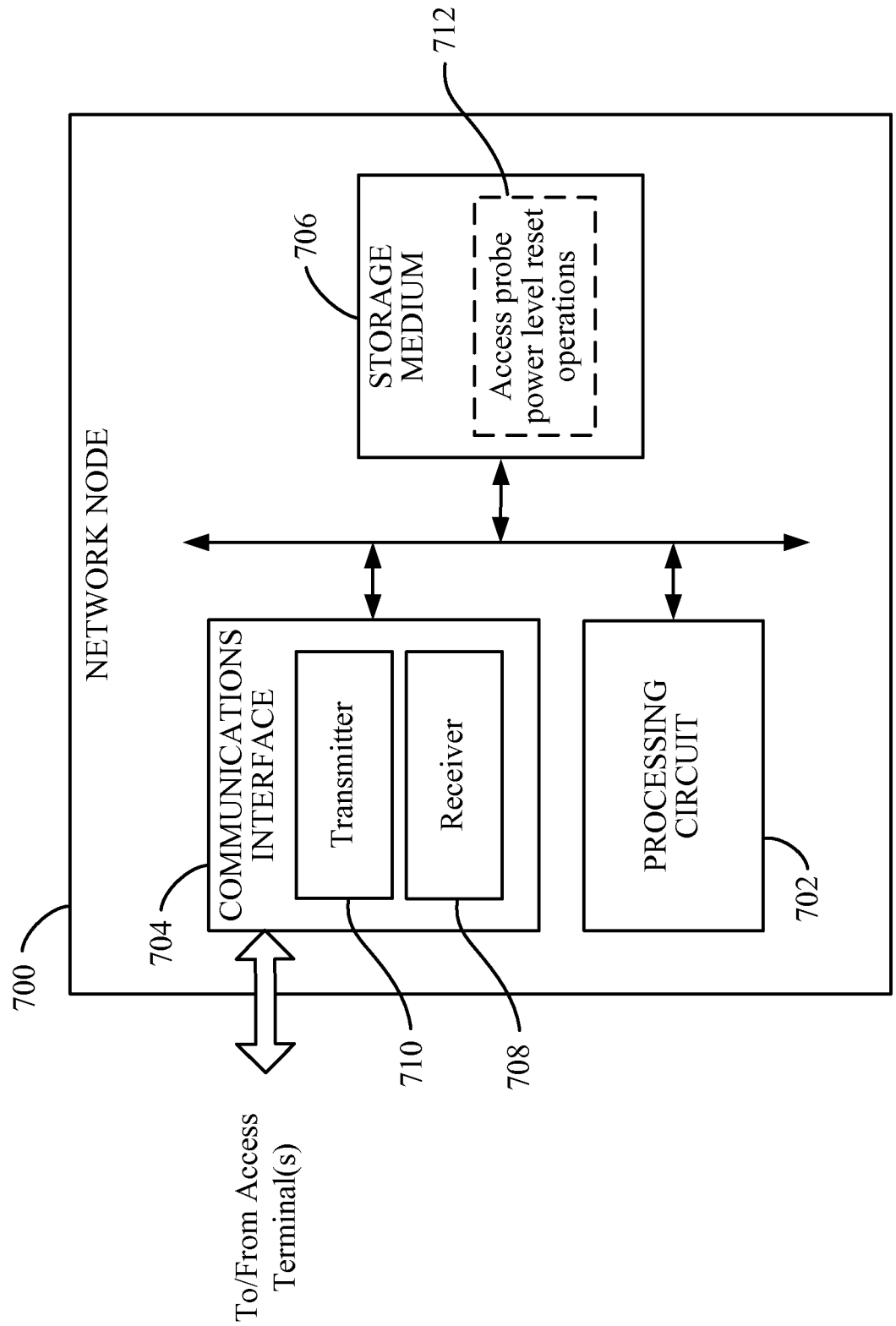
FIG. 7 is a block diagram illustrating select components of a network node according to at least one example.

Turning to FIG. 7, a block diagram is shown illustrating select components of a network node 700 according to at least one implementation. The network node 700 may include a processing circuit 702 coupled to a communications interface 704 and to a storage medium 706.

The processing circuit 702 is arranged to obtain, process and/or send data, control data access and storage, issue commands, and control other desired operations. The processing circuit 702 may include circuitry configured to implement desired programming provided by appropriate media in at least one example, and may be implemented and/or adapted in a manner similar to the processing circuit 502 described above.

The communications interface 704 is configured to facilitate wireless communications of the network node 700. For example, the communications interface 704 may include circuitry and/or programming adapted to facilitate the communication of information bi-directionally with respect to one or more access terminals. The communications interface 704 may be coupled to one or more antennas (not shown), and includes wireless transceiver circuitry, including at least one receiver circuit 708 (e.g., one or more receiver chains) and/or at least one transmitter circuit 710 (e.g., one or more transmitter chains).

The storage medium 706 may represent one or more devices for storing programming and/or data, such as processor executable code or instructions (e.g., software, firmware), electronic data, databases, or other digital information. The storage medium 706 may be configured and/or implemented in a manner similar to the storage medium 506 described above.

Like the storage medium 506, the storage medium 706 includes programming stored thereon. The programming stored by the storage medium 706, when executed by the processing circuit 702, causes the processing circuit 702 to perform one or more of the various functions and/or process steps described herein. For example, the storage medium 706 may include access probe power level reset operations 712 adapted to cause the processing circuit 702 to send a transmission to an access terminal indicating that a subsequent access attempt should include a first access probe transmitted at a default initial power level. Thus, according to one or more aspects of the present disclosure, the processing circuit 702 is adapted to perform (in conjunction with the storage medium 706) any or all of the processes, functions, steps and/or routines for any or all of the network nodes described herein (e.g., base station 102, base station controller 206, MSC/VLR 208, and/or network node 402 in FIGS. 1-4). As used herein, the term "adapted" in relation to the processing circuit 702 may refer to the processing circuit 702 being one or more of configured, employed, implemented, and/or programmed to perform a particular process, function, step and/or routine according to various features described herein.

Figure 8:
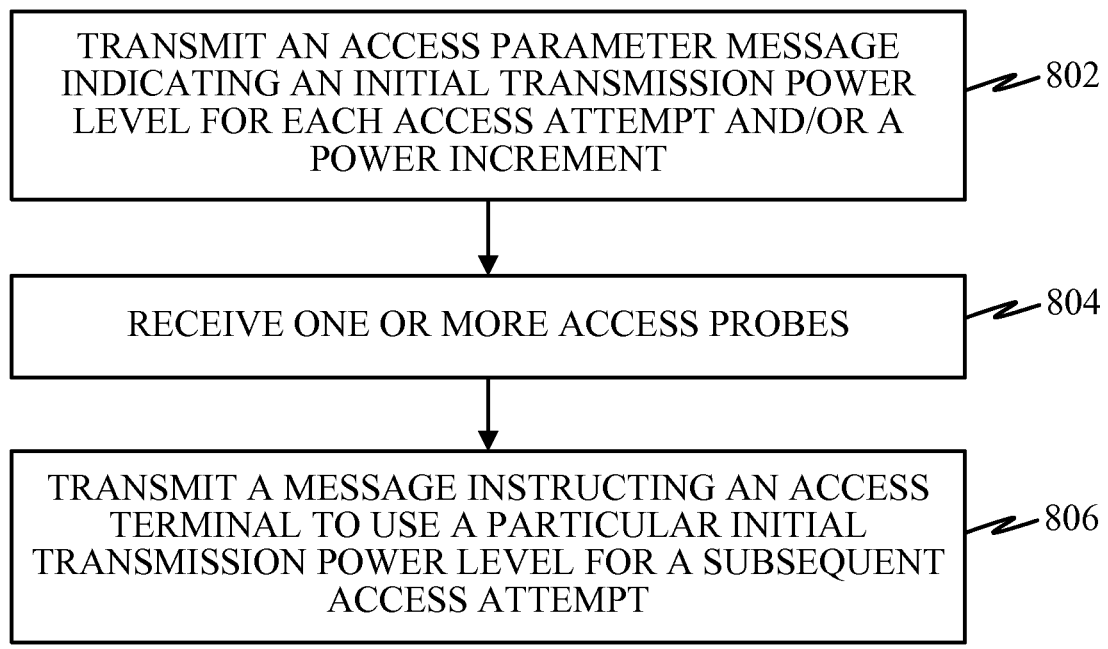
FIG. 8 is a flow diagram illustrating a method operational on a network node according to at least one example.

FIG. 8 is a flow diagram illustrating at least one example of a method operational on a network node, such as the network node 700. Referring to FIGS. 7 and 8, a network node 700 may transmit an access parameter message to one or more access terminals at step 802. The access parameter message can indicate an initial transmission power level to be employed by the access terminals for each access attempt and/or a power increment to be employed in an access probe sequence. For example, the processing circuit 702 executing the access probe power level reset operations 712 may generate an access parameter message. The processing circuit 702 executing the access probe power level reset operations 712 may further transmit the generated access parameter message via the communications interface 704.

At step 804, the network node 700 may receive one or more access probes from one or more access terminals. For example, the processing circuit 702 executing the access probe power level reset operations 712 may receive one or more access probes via the communications interface 704. In some instances, a received access probe may be an initial access probe transmitted by an access terminal at a power level based at least in part on one or more parameters associated with a plurality of previously successful access probes.

At step 806, the network node 700 may transmit a message instructing an access terminal to use a particular initial transmission power level for a subsequent access attempt. For instance, the processing circuit 702 executing the access probe power level reset operations 712 may generate the message, and may send the message via the communications interface 704. In some examples, this message may comprise another access parameter message, where this other access parameter message includes one or more indicators adapted to instruct an access terminal to employ a particular initial transmission power level for a subsequent access attempt. Such an access parameter message may be adapted to instruct the access terminal, even if the access terminal is generally adapted to ignore such access parameter messages. For instance, this access parameter message may include a flag or other indicator adapted so that the access terminal will not ignore the access parameter message. In other examples, the message may comprise a message that is distinct from an access parameter message. In at least some instances, the processing circuit 702 may be adapted to send such a message in response to a change to one or more parameters at the network node 700 that may have an effect on the transmission power level employed by the access terminals to send access probes.

The particular initial transmission power level may be a value for an initial transmission power level, where the value is included in the message. In other examples, the particular initial transmission power level may be a default value. Such a default value may be included in the message, or may be a value previously known to the access terminal. For instance, the default value may have been pre-provisioned in the access terminal, such as at an initial power-up registration.

While the above discussed aspects, arrangements, and embodiments are discussed with specific details, one or more of the components, steps, features and/or functions illustrated in FIGS. 1, 2, 3, 4, 5, 6, 7 and/or 8 may be rearranged and/or combined into a single component, step, feature or function or embodied in several components, steps, or functions. Additional elements, components, steps, and/or functions may also be added without departing from the disclosure. The apparatus, devices and/or components illustrated in FIGS. 1, 2, 5 and/or 7 may be configured to perform one or more of the methods, features, or steps described in FIGS. 3, 4, 6 and/or 8. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The terms "machine-readable medium", "computer-readable medium", and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices. The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

We claim:

1. An access terminal, comprising:
a communications interface;
a storage medium; and
a processing circuit coupled to the communications interface and the storage medium, the processing circuit adapted to:
  transmit via the communications interface a plurality of previously successful access probes;
  determine an initial transmission power level based at least in part on one or more parameters associated with the plurality of previously successful access probes; and
  transmit via the communications interface an initial access probe of a subsequent access attempt, wherein the initial access probe is transmitted at the determined initial transmission power level;
wherein determining the initial transmission power level is further based on at least one of:
  an average power level of at least one or more of the plurality of previously successful access probes; and
  a difference of an average open-loop power level associated with the plurality of previously successful access probes and an open-loop power level associated with the subsequent access attempt.

2. The access terminal of claim 1, wherein the processing circuit is further adapted to:
receive via the communications interface a message instructing the access terminal to employ a particular initial transmission power level for a subsequent access attempt.

3. An access terminal comprising:
a communications interface;
a storage medium; and a processing circuit coupled to the communications interface and the storage medium, the processing circuit adapted to:
  transmit via the communications interface a plurality of previously successful access probes;
  determine an initial transmission power level based at least in part on one or more parameters associated with the plurality of previously successful access probes;
  transmit via the communications interface an initial access probe of a subsequent access attempt, wherein the initial access probe is transmitted at the determined initial transmission power level;
  determine whether the access terminal is mobile or at least substantially stationary;
  transmit the initial access probe of a subsequent access attempt at the determined initial transmission power level when the access terminal is determined to be at least substantially stationary; and
  transmit the initial access probe of a subsequent access attempt at a default initial transmission power level when the access terminal is determined to be mobile.

4. An access terminal comprising:
a communications interface;
a storage medium; and
a processing circuit coupled to the communications interface and the storage medium, the processing circuit adapted to:
  transmit via the communications interface a plurality of previously successful access probes;
  determine an initial transmission power level based at least in part on one or more parameters associated with the plurality of previously successful access probes;
  transmit via the communications interface an initial access probe of a subsequent access attempt, wherein the initial access probe is transmitted at the determined initial transmission power level;
  monitor an access terminal location, a radio environment, or both; and
  transmit an initial access probe of a subsequent access attempt at a default initial transmission power level in response to a sufficient change in the access terminal location, the radio environment, or both.

5. A method operational at an access terminal, comprising:
conducting a plurality of preceding access attempts, where each preceding access attempt comprises transmitting access probes at successively increasing power levels until an access probe is successful;
determining an initial transmission power level based at least in part on one or more parameters associated with the plurality of previously successful access probes; and
conducting a subsequent access attempt, where an initial access probe is transmitted at the determined initial transmission power level;
  wherein determining the initial transmission power level is further based on at least one of:
    an average power level of at least one or more of the plurality of previously successful access probes; and
    a difference of an average open-loop power level associated with the plurality of previously successful access probes and an open-loop power level associated with the subsequent access attempt.

6. The method of claim 5, further comprising:
receiving a message instructing the access terminal to employ a particular initial transmission power level for a subsequent access attempt.

7. A method operational at an access terminal, comprising:
conducting a plurality of preceding access attempts, where each preceding access attempt comprises transmitting access probes at successively increasing power levels until an access probe is successful;
determining an initial transmission power level based at least in part on one or more parameters associated with the plurality of previously successful access probes; and
conducting a subsequent access attempt, where an initial access probe is transmitted at the determined initial transmission power level;
  wherein determining the initial transmission power level based at least in part on one or more parameters associated with the plurality of successful access probes comprises:
    determining an average power level ($P_{AP}$) of at least some of the plurality of previously successful access probes;
    determining an average open-loop power level ($R_{OLsucc}$) associated with the plurality of previously successful access probes;
    determining an open-loop power level ($R_{OLnew}$) associated with the subsequent access attempt; and
    determining the initial transmission power level (P) from the equation $P=P_{AP}+(R_{OLsucc}-R_{OLnew})$.

8. A method operational at an access terminal, comprising:
conducting a plurality of preceding access attempts, where each preceding access attempt comprises transmitting access probes at successively increasing power levels until an access probe is successful;
determining an initial transmission power level based at least in part on one or more parameters associated with the plurality of previously successful access probes;
conducting a subsequent access attempt, where an initial access probe is transmitted at the determined initial transmission power level;
determining whether the access terminal is mobile or at least substantially stationary;
transmitting the initial access probe of a subsequent access attempt at the determined initial transmission power level in response to determining the access terminal is at least substantially stationary; and
transmitting the initial access probe of a subsequent access attempt at a default initial transmission power level in response to determining the access terminal is mobile.

9. A method operational at an access terminal, comprising:
conducting a plurality of preceding access attempts, where each preceding access attempt comprises transmitting access probes at successively increasing power levels until an access probe is successful;
determining an initial transmission power level based at least in part on one or more parameters associated with the plurality of previously successful access probes;
conducting a subsequent access attempt, where an initial access probe is transmitted at the determined initial transmission power level;
monitoring an access terminal location, a radio environment or both; and
transmitting an initial access probe of a subsequent access attempt at a default initial transmission power level in response to a sufficient change in the access terminal location, the radio environment, or both.

10. An access terminal, comprising:
- means for conducting a plurality of preceding access attempts, where each preceding access attempt comprises transmitting access probes at successively increasing power levels until an access probe is successful;
- means for determining an initial transmission power level based at least in part on one or more parameters associated with the plurality of previously successful access probes; and
- means for conducting a subsequent access attempt, where an initial access probe is transmitted at the determined initial transmission power level;
- wherein determining the initial transmission power level with the means for determining is further based on at least one of:
  - an average power level of at least one or more of the plurality of previously successful access probes; and
  - a difference of an average open-loop power level associated with the plurality of previously successful access probes and an open-loop power level associated with the subsequent access attempt.

11. A processor-readable medium comprising programming operational on an access terminal, which when executed by a processor, causes the processor to:
- determine an initial transmission power level based at least in part on one or more parameters associated with a plurality of previously successful access probes; and
- transmit an initial access probe of a subsequent access attempt, wherein the initial access probe is transmitted at the determined initial transmission power level;
- wherein determining the initial transmission power level is further based on at least one of:
  - an average power level of at least one or more of the plurality of previously successful access probes; and
  - a difference of an average open-loop power level associated with the plurality of previously successful access probes and an open-loop power level associated with the subsequent access attempt.

12. A network node, comprising:
- a communications interface;
- a storage medium; and
- a processing circuit coupled to the communications interface and the storage medium, the processing circuit adapted to:
  - receive one or more access probes from an access terminal via the communications interface;
  - send via the communications interface a message instructing the access terminal to employ one of a particular initial transmission power level for a subsequent access attempt or a default transmission power level for the subsequent access attempt when determined by the network; and
  - receive additional one or more access probes from the access terminal of another subsequent access attempt at the default transmission power level when determined by the network whereupon each subsequent access probe is transmitted at a sequentially higher transmission power level until an access probe is successful.

13. The network node of claim 12, wherein the processing circuit is further adapted to:
- send via the communications interface an access parameter message prior to receiving one or more access probes, wherein the access parameter message is adapted to indicate an initial transmission power level to be employed for access attempts and a power increment value.

14. The network node of claim 12, wherein at least one of the one or more received access probes comprises an initial access probe transmitted at a power level based at least in part on one or more parameters associated with a plurality of previously successful access probes.

15. The network node of claim 12, wherein the message instructing the access terminal to employ the particular initial transmission power level comprises an access parameter message.

16. The network node of claim 12, wherein a value defining the particular initial transmission power level is included in the message instructing the access terminal to employ the particular initial transmission power level.

17. A method operational at a network node, comprising:
- receiving one or more access probes from an access terminal;
- transmitting a message instructing the access terminal to employ a particular initial transmission power level for a subsequent access attempt, or a default transmission power level for the subsequent access attempt when determined by the network; and
- receiving additional one or more access probes from the access terminal of another subsequent access attempt at the default transmission power level when determined by the network whereupon each subsequent access probe is transmitted at a sequentially higher transmission power level until an access probe is successful.

18. The method of claim 17, further comprising:
- transmitting an access parameter message prior to receiving the one or more access probes, wherein the access parameter message is adapted to indicate an initial transmission power level and a power increment value to be employed for access attempts.

19. The method of claim 17, wherein receiving the one or more access probes from the access terminal comprises:
- receiving an initial access probe transmitted at a power level based at least in part on one or more parameters associated with a plurality of previously successful access probes.

20. The method of claim 17, wherein transmitting the message instructing the access terminal to employ the particular initial transmission power level comprises:
- transmitting the message comprising a value defining the particular initial transmission power level.

21. The method of claim 17, wherein transmitting the message instructing the access terminal to employ the particular initial transmission power level comprises:
- transmitting an access parameter message including an indicator adapted to instruct the access terminal to employ the particular initial transmission power level.

22. A network node, comprising:
- means for receiving one or more access probes from an access terminal; and
- means for transmitting a message instructing the access terminal to employ a particular initial transmission power level for a subsequent access attempt, or a default transmission power level for the subsequent access attempt when determined by the network; and
- means for receiving additional one or more access probes from the access terminal of another subsequent access attempt at the default transmission power level when determined by the network whereupon each subsequent access probe is transmitted at a sequentially higher transmission power level until an access probe is successful.

23. The network node of claim 22, further comprising:
means for transmitting an access parameter message prior to receiving the one or more access probes, wherein the access parameter message is adapted to indicate an initial transmission power level and a power increment value to be employed for access attempts.

24. A processor-readable medium comprising programming operational on a network node, which when executed by a processor, causes the processor to:
receive one or more access probes from an access terminal;
send a message instructing the access terminal to employ a particular initial transmission power level for a subsequent access attempt, or a default transmission power level for the subsequent access attempt when determined by the network; and
receive additional one or more access probes from the access terminal of another subsequent access attempt at the default transmission power level when determined by the network whereupon each subsequent access probe is transmitted at a sequentially higher transmission power level until an access probe is successful.

25. An access terminal, comprising:
a communications interface;
a storage medium; and
a processing circuit coupled to the communications interface and the storage medium, the processing circuit adapted to:
transmit via the communications interface a plurality of previously successful access probes;
determine an initial transmission power level based at least in part on one or more parameters associated with the plurality of previously successful access probes;
transmit via the communications interface an initial access probe of a subsequent access attempt, wherein the initial access probe is transmitted at the determined initial transmission power level; and
transmit via the communications interface another initial access probe of another subsequent access attempt at a default transmission power level when receiving via the communications interface a network generated message instructing the access terminal to reset transmission to the default transmission power level, whereupon each subsequent access probe is transmitted at a sequentially higher transmission power level until an access probe is successful.

* * * * *